(12) United States Patent
Mikiya et al.

(10) Patent No.: US 6,382,935 B1
(45) Date of Patent: May 7, 2002

(54) ELECTROMAGNETIC DIAPHRAGM PUMP

(75) Inventors: Toshio Mikiya; Kenji Mizuno; Atsuki Hashimoto, all of Tokyo (JP)

(73) Assignee: Nitto Kohki Co., LTD, Tokyo (JP)

( * ) Notice: Subject to any disclaimer, the term of this patent is extended or adjusted under 35 U.S.C. 154(b) by 0 days.

(21) Appl. No.: 09/497,812

(22) Filed: Feb. 3, 2000

(30) Foreign Application Priority Data

Nov. 8, 1999 (JP) .......................................... 11-316891

(51) Int. Cl.[7] .......................... F04B 17/00; F04B 17/04; F04B 23/04
(52) U.S. Cl. ..................... 417/413.1; 417/416; 417/533
(58) Field of Search ............... 417/412, 413.1, 417/410.1, 312, 313, 533, 534, 416, 417

(56) References Cited

U.S. PATENT DOCUMENTS

| | | | | |
|---|---|---|---|---|
| 1,556,059 A | * | 10/1925 | Williams | 417/416 |
| 2,732,124 A | * | 1/1956 | Poliansky | 230/55 |
| 2,815,901 A | * | 12/1957 | Hale | 230/184 |
| 3,931,554 A | * | 1/1976 | Spentzas | 318/122 |
| 4,002,935 A | * | 1/1977 | Brauer | 310/27 |
| 4,682,937 A | * | 7/1987 | Credle, Jr. | 417/393 |
| 4,718,832 A | | 1/1988 | Takahashi | 417/417 |
| 4,837,467 A | | 6/1989 | Newman | 310/12 |
| 4,857,786 A | | 8/1989 | Nihei et al. | 310/156 |
| 4,868,431 A | | 9/1989 | Karita et al. | 310/12 |
| 4,988,268 A | * | 1/1991 | Kurihara | 417/312 |
| 5,011,379 A | | 4/1991 | Hashimoto | 417/360 |
| 5,013,223 A | | 5/1991 | Takahashi et al. | 417/413 |
| 5,104,298 A | * | 4/1992 | Takahashi et al. | 417/415 |
| 5,121,296 A | | 6/1992 | Hsu | 361/395 |
| 5,588,810 A | * | 12/1996 | DiFlora et al. | 417/312 |

FOREIGN PATENT DOCUMENTS

| | | | | |
|---|---|---|---|---|
| DE | 69209308 | | 11/1996 | |
| DE | 69-209308 T2 | * | 11/1996 | .......... H02K/33/16 |
| EP | 0154558 | | 9/1985 | |
| EP | 0926341 | | 6/1999 | |
| GB | 397493 | | 8/1933 | |
| GB | 1220857 | | 1/1971 | |
| GB | 1555814 | | 11/1979 | |
| GB | 2300312 | | 10/1996 | |
| JP | 61207883 | | 9/1986 | |
| JP | 63-262056 | * | 10/1988 | .......... H02K/33/16 |
| JP | 63262056 | | 10/1988 | |
| JP | 8-28454 | | 1/1996 | |
| JP | 10-288162 | | 10/1998 | |

OTHER PUBLICATIONS

Official Action DE 10004520.0–15 (Aug. 21, 2000).

* cited by examiner

Primary Examiner—Timothy S. Thorpe
Assistant Examiner—Timothy P. Solak
(74) Attorney, Agent, or Firm—Fulbright & Jaworski L.L.P.

(57) ABSTRACT

An electromagnetic diaphragm pump has two compression sections operated by an AC. Each of the compression sections comprises an oscillator disposed within a housing and holding a permanent magnet, a pair of diaphragms each having a peripheral portion fixed to the housing and a central portion fixed to an end portion of the oscillator, a pair of field cores sandwiching the oscillator and having magnetic poles displaced relative to the permanent magnet by a predetermined amount, coils for producing magnetic fluxes at the field cores, and compression chambers opposed to end portions of the oscillator, one of walls of each of the compression chambers being formed by an associated one of the diaphragms. The field cores have the magnetic poles magnetized by the AC supplied to the coils, whereby the permanent magnet is alternately attracted and repelled by the magnetic poles to vibrate the diaphragms and to vary the volumes of the compression chambers. The two compression chambers share one field core.

10 Claims, 10 Drawing Sheets

ELECTROMAGNETIC DIAPHRAGM PUMP

BACKGROUND OF THE INVENTION

The present invention relates to an electromagnetic diaphragm pump. More particular, this invention relates to a small-sized, light-weight electromagnetic diaphragm pump suitable for an outdoor air blower.

In general, an electromagnetic diaphragm pump comprises an oscillator, which has at its central portion two permanent magnets arranged to have mutually opposite polarities and is supported at both ends by diaphragms, and electromagnets disposed to be opposed to each other with the oscillator interposed. When an AC is supplied to the electromagnets, the polarities of the electromagnets are alternately changed according to the frequency of the AC. Consequently, the permanent magnets are attracted and repelled by the electromagnets each time the polarities of the electromagnets are changed. The diaphragms are vibrated by the axially moved oscillator.

Each diaphragm serves as a support member for the oscillator and constitutes a wall defining a compression chamber. With the vibration of the diaphragm, the volume of the compression chamber increases and decreases. Accordingly, fluid is drawn into the compression chamber via an inlet port formed in another wall which defines the compression chamber along with the diaphragm, and the fluid is discharged from an outlet.

FIGS. 19 to 21 show a specific structure of a conventional electromagnetic diaphragm pump (hereinafter referred to merely as "pump"). FIG. 19 is a cross-sectional view showing the pump from above, FIG. 20 is a cross-sectional side view, and FIG. 21 is a left-hand side view of FIG. 20.

A pump 1 has a housing constituted by a frame 2, a soundproof cover 3 and head covers 4, 5 arranged on the left and right sides of the frame 2. Each of the head covers 4 and 5 is fixed to the frame 2 by four screws 4a, 4b, 4c, 4d; 5a, 5b, 5c, 5d (two screws 5a, 5b alone being shown). Core holders 6, 7 are erected on a bottom portion of the frame 2. Two field cores 8, 9 having the same size are supported by the core holders 6, 7 and fixed on the frame 2 by screws 8a–8c; 9a–9c. Coils 10, 11 are wound around the field cores 8, 9. An oscillator 12 is provided between the field cores 8, 9. Since the structure for attachment of diaphragms 15a, 15b fixed to both ends of the oscillator 12 and internal structures of the head covers 4, 5 covering the diaphragms are common on the left and right sides of the oscillator 12, the left-hand structure alone shown in the figures will be described and a description of the right-hand structure is omitted.

A pair of center plates 13, 14 are fixed to an end portion of the oscillator 12. The diaphragm 15a is clamped between the first and second center plates 13, 14. The diaphragm 15a has a disc shape, and its outer peripheral portion, that is, a rim portion, is clamped by a ring 16 fitted in the frame 2 and the head cover 4. Specifically, the oscillator 12 is fixed and supported at both ends by the diaphragms 15a, 15b and supported onto the frame 2.

A compression chamber 17 defined by the diaphragm 15a and head cover 4 is disposed at the end portion of the oscillator 12. A pair of inlet ports 19 for drawing air into the compression chamber 17 are formed in one of walls defining the compression chamber 17. The inlet ports 19 are provided with plate-like valve members which are bent towards the compression chamber 17 to open the inlet ports 19. This one of the walls is also provided with a pair of outlet ports for forcing the compressed air out of the compression chamber 17. The outlet ports 20 are provided with plate-like valves which are bent away from the compression chamber 17 to open the outlet ports 20.

The head cover 4 is provided with an inlet nipple 21 for drawing air and an outlet nipple 22 for discharging compressed air. An inlet chamber 23 is provided between the inlet nipple 21 and inlet ports 19, and an outlet chamber 24 is provided between the outlet nipple 22 and outlet ports 20. Permanent magnets 31, 32 magnetized to have mutually opposite polarities are fixed to the oscillator 12. An AC is supplied from an AC power supply (not shown) to the coils 10, 11 over a cable 33. The cable 33 is covered with a protection tube 34, introduced into the pump 1, divided into a plurality of coil lead wires 35 within the pump 1, and connected to the coils 10, 11.

The pump 1 is fixed to a bracket 41 via legs 40 formed of elastic material, such as rubber, for vibro-isolation. The bracket 41 is attached to a desired location and the pump is driven.

When an AC with a commercial power frequency is supplied to the coils 10, 11 over the cable 33, the pump starts to operate. With the supply of AC, both end portions of the E-shaped main cores 8, 9, i.e. those portions thereof opposed to the oscillator 12, are caused to have magnetic poles alternately with polarities for attracting and repelling the permanent magnets fixed to the oscillator 12. The oscillator 12 vibrates in the right-and-left direction at the aforementioned commercial power frequency. In accordance with the vibration, the diaphragms 15a, 15b take in air from the inlet nipple 21, inlet chamber 23 and inlet ports 19 and compress the air in the compression chamber 17. The compressed air is discharged via the outlet ports 20, outlet chamber 24 and outlet nipple 22.

When a large discharge amount is to be obtained using the pump of the above type, it is thought to couple of a plurality of this type of pumps. For example, if two pumps each having a discharge amount of 40 l/min. are coupled, a discharge amount of 80 l/min. is obtained. Jpn. Pat. Appln. KOKAI Publication No. 61-207883 proposes an electromagnetic reciprocal pump wherein a plurality of pumps are coupled. The following problems, however, will arise if a plurality of electromagnetic diaphragm pumps are coupled.

Although a discharge amount can be increased by integrally coupling plural pumps, the size of the apparatus increases accordingly. Where a plurality of pumps are integrally coupled and used as an outdoor blower, etc., an enclosure has to be provided for preventing dropping. In such a case, in particular, the size of the apparatus including the enclosure increases and the location for installation is limited. Under the circumstance, there is a demand for reduction in size. In addition, the electrical wiring among the plural pumps becomes complex.

Besides, the diaphragms used in the pump are worn due to long-time use, and they need to be replaced with new ones periodically. In the case of the apparatus in which plural pumps are merely coupled, the housing of each pump needs to be disassembled for exchanging the diaphragms. As a result, the number of steps for maintenance increases.

Even in the case of driving a single pump, the following problems will arise.

First, since two field cores 8, 9 of the same size, around which coils are wound, are disposed in the pump, the size of the pump increases and the weight of the pump also increases.

Second, since many screws are used to fix the field cores 8, 9, head covers 4, 5, etc. to the frame 2, the assembly work becomes complex and the cost of the pump increases. For example, six screws (8a–8c; 9a–9c) are used to fix the field cores 8, 9, and eight screws (4a–4d; 5a–5d) are used to fix the head covers 4, 5.

Third, great vibration noise of the diaphragms leaks to the outside via the chamber containing the field cores 8, 9.

Fourth, since the size of the pump is large, as mentioned above, the buffer vessel for smoothing the pulsation of compressed air needs to be connected to the outlet nipple 22 via a pipe. This increases the size of the apparatus, makes the structure complex, and increases the cost. Moreover, the space for installation of the pump and buffer vessel increases.

BRIEF SUMMARY OF THE INVENTION

The present invention has been made in consideration of the above circumstances, and a main object of the invention is to provide a small-sized, light-weight electromagnetic diaphragm pump which permits easy maintenance.

More specifically, with this main object taken into account, this invention aims at providing a small-sized, large-output electromagnetic diaphragm pump having one or more compression sections each functioning like a conventional independent pump.

Another object of the invention is to provide an electromagnetic diaphragm pump permitting easy assembly.

Still another object of the invention is to provide an electromagnetic diaphragm pump wherein vibration noise of diaphragms is small.

Still another object of the invention is to provide an electromagnetic diaphragm pump requiring no large cost and space for a buffer vessel for smoothing pulsation of compressed air.

In order to achieve the above objects, according to an aspect of the present invention, there is provided an electromagnetic diaphragm pump having an AC power supply and a plurality of compression sections operated by an AC supplied from the AC power supply. Each of the compression sections comprises: a housing; an oscillator disposed within the housing and holding a permanent magnet; a pair of diaphragms each having a peripheral portion fixed to the housing and a central portion fixed to an end portion of the oscillator. Each of the diaphragms supports the oscillator so as to be able to vibrate in a direction perpendicular to a plane in which the diaphragm is disposed. Each compression section also comprises a pair of field cores sandwiching the oscillator and having magnetic poles displaced relative to the permanent magnet by a predetermined amount in a direction of vibration of the oscillator; coils supplied with an AC from the AC supply to produce magnetic fluxes at the field cores; compression chambers defined within the housing to be opposed to end portions of the oscillator, one of walls of each of the compression chambers being formed by an associated one of the diaphragms; and inlet ports with valves capable of drawing air into the compression chamber; and outlet ports with valves capable of forcing air out of the compression chamber. The inlet ports and outlet ports being formed within the housing. The field cores have the magnetic poles magnetized by the AC supplied to the coils, whereby the permanent magnet is alternately attracted and repelled by the magnetic poles to vibrate the diaphragms. Adjacent two of the compression sections have one shared field core.

According to this electromagnetic diaphragm pump, the permanent magnet of the oscillator is alternately attracted and repelled by the magnetic poles magnetized by AC, and the oscillator vibrates. The diaphragms supporting the oscillator on the housing vibrate along with the oscillator, and the compression chambers expand and contract. Thereby, fluid flows into the compression chambers, and compressed fluid is discharged from the outlet.

Although the discharge volume is increased by the plural compression sections, the number of field cores can be reduced and the entire apparatus can be reduced in size and weight.

It is preferable that the AC supply has a circuit for supplying half waves of the AC to the coils such that at least one of the plurality of oscillators is displaced in a direction opposite to the other oscillators. Unlike the case where all oscillators are displaced in the same direction at a time, unbalanced forces cancel one another and vibrations are reduced.

Preferably, the housing has head covers integrally covering a plurality of the diaphragms of adjacent ones of the compression sections and constituting the other walls of the compression chambers of the adjacent compression sections, and the inlet ports and the outlet ports are formed in the head covers. In this case, plural diaphragms can be accessed by removing a single head cover.

The coils may be wound around one of the pair of field cores. In this case, since a field core with no coil is included, the entire apparatus is reduced in weight and size.

According to another aspect of the invention, there is provided an electromagnetic diaphragm pump comprising: a housing; an oscillator disposed within the housing and holding a permanent magnet; a pair of diaphragms each having a peripheral portion fixed to the housing and a central portion fixed to an end portion of the oscillator, each of the diaphragms supporting the oscillator so as to be able to vibrate in a direction perpendicular to a plane in which the diaphragm is disposed; a pair of field cores sandwiching the oscillator and having magnetic poles displaced relative to the permanent magnet by a predetermined amount in a direction of vibration of the oscillator; a coil supplied with an AC to produce a magnetic flux at the field core; compression chambers defined within the housing to be opposed to end portions of the oscillator, one of walls of each of the compression chambers being formed by an associated one of the diaphragms; and inlet ports with valves capable of drawing air into the compression chamber and outlet ports with valves capable of forcing air out of the compression chamber, the inlet ports and outlet ports being formed within the housing, wherein the field cores have the magnetic poles magnetized by the AC supplied to the coil, whereby the permanent magnet is alternately attracted and repelled by the magnetic poles to vibrate the diaphragms.

The pair of field cores comprise an E-shaped main core around which the coil is wound and which has a central leg portion, and an E-shaped back core around which no coil is wound, the E-shaped back core being disposed to be opposed to the E-shaped main core. According to this electromagnetic diaphragm pump, the back core contained in the housing and the housing can be reduced in size, without decreasing the output performance of compressed fluid in the pump.

It is preferably that each of the main core and the back core has a leg portion projecting toward the oscillator, the leg portion of the main core having a length greater than a length of the back core. The field core can be reduced in size and weight.

It is preferable that a distance between the main core and the oscillator is greater than a distance between the back core and the oscillator. In this case, the force of the main core acting on the oscillator is substantially equalized to the force of the back core acting on the oscillator. The vibration of the oscillator can be made smooth, and the life of the diaphragms fixed to both ends of the oscillator can be increased.

It is preferable that the housing includes a plurality of side walls, a bottom wall, and a plurality of slitted ribs extending from the bottom wall near the side walls, and the pump is provided with a cap having a plurality of downwardly extending bosses formed at locations corresponding to the slitted ribs, wherein when the bosses of the cap are inserted in the slitted ribs of the housing, the slitted ribs are extended outward to fix at least one of the main core and the back core to the housing. In this case, the cores can be fixed without using screws. Since there is no need to form holes for passing screws, unlike the prior art, the effective magnetic paths of the cores can be improved.

It is preferable that the main core and the back have, at their portions coming in contact with the slitted ribs, grooves extending in the same direction as the slitted ribs and having shapes corresponding to shapes of parts of outer peripheral portions of the slitted ribs. In addition, it is preferable that the cap has a plurality of hooks at a peripheral portion thereof, the hooks extending in the same direction as the slitted ribs, the cap being secured to the housing by means of the hooks. This cap can be fixed to the housing without using screws.

There is also provided an electromagnetic diaphragm pump having a housing which includes opposed side walls, a plurality of hooks extending outward from the side walls to accommodate the oscillator, the field cores and the coil, and head covers coupled to the opposed side walls of the housing. The head covers have hook receiving holes at locations opposed to the hooks formed on the housing, the head covers being coupled to the housing when the hooks are inserted in the hook receiving holes. The head covers can be secured to the housing without using screws.

It is preferable that the housing has guides extending from the opposed side walls in the same direction as the hooks and functioning as fluid inlets, and the guides guide the head covers when the head covers are coupled to the housing.

There is also provided an electromagnetic diaphragm pump having a housing which includes opposed side walls, head covers coupled to the opposed side walls of the housing and having outlet nipples for discharging compressed fluid, and a buffer vessel directly connectable to the outlet nipples, the housing accommodating the oscillator, the field cores and the coil. In this pump, the buffer vessel can be directly coupled to the housing. Unlike the prior art, there is no need to couple the buffer vessel to the housing of the pump via a pipe. Thus, the pump and the buffer vessel can be integrally constructed as a compact unit.

Where the electromagnetic diaphragm pump further comprises gaskets attached to the outlet nipples and each having a bottom wall and a side wall and at least one of the bottom wall and side wall of each gasket has plural small holes, the beat noise of valves transmitted to the buffer vessel can be reduced and a silent pump can be provided.

There is also provided an electromagnetic diaphragm pump having a housing which includes a housing having opposed side walls, the housing accommodating the oscillator, the field cores and the coil. The oscillator has end portions penetrating the side walls, the side walls have diaphragm receiving walls for receiving the diaphragms fixed to the end portions of the oscillator, and each of the diaphragm receiving walls has an opening with the same size as a cross section of the oscillator. According to this pump, since the hole formed in the diaphragm receiving wall is much smaller than the hole in the prior art, vibration noise of diaphragms leaking to the outside through the housing can be greatly reduced and a silent pump can be provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
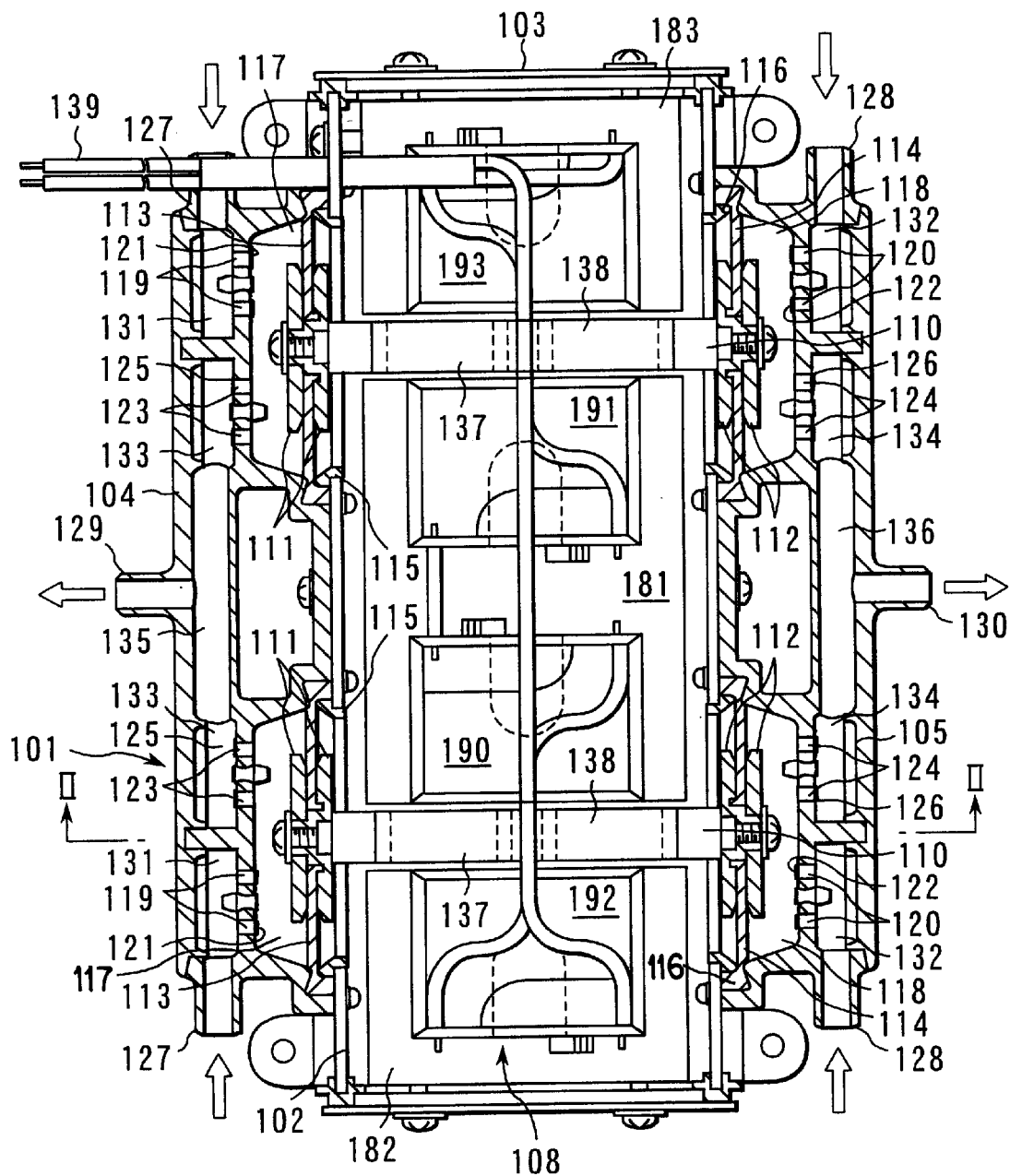
FIG. 1 is a cross-sectional plan view of a pump having two compression sections according to a preferred embodiment of the present invention.
Figure 2:
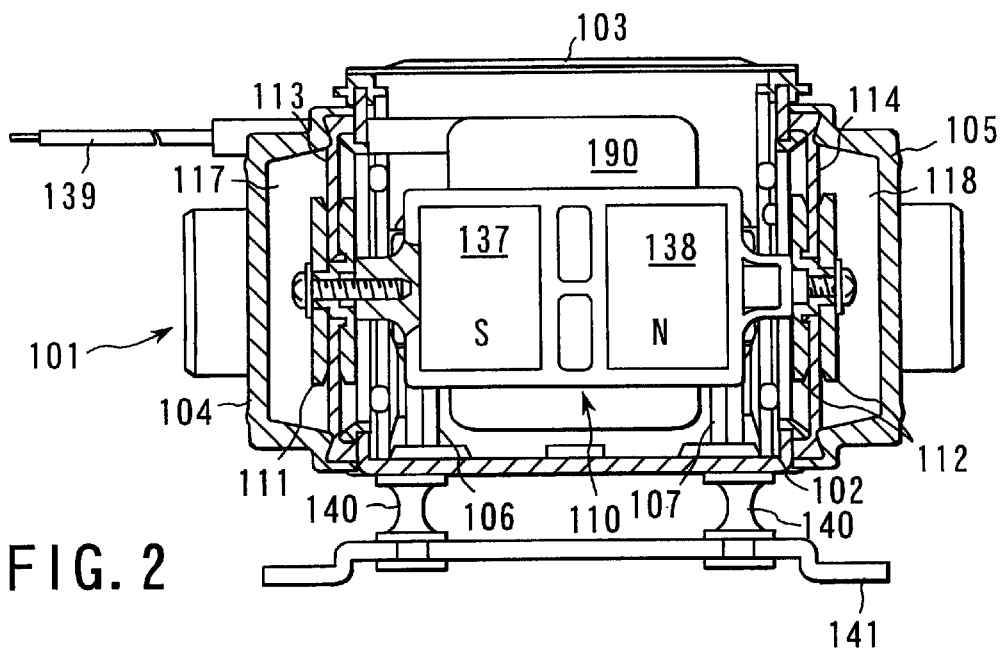
FIG. 2 is a cross-sectional side view of the pump, taken along line II—II in FIG. 1.

FIGS. 1 and 2 show the whole structure of an electromagnetic diaphragm pump (hereinafter referred to merely as "pump") 101 according to a preferred embodiment of the present invention. The pump 101 of this embodiment has a double-pump structure having two compression sections each functioning as a single pump. Since the two compression sections have the same structure, the same or common elements in the two sections are denoted by like reference numerals and a detailed description thereof is omitted, unless otherwise indicated.

As is shown in FIGS. 1 and 2, a pump 101 has a housing constituted by a frame 102, a soundproof cover 103 and head covers 104 and 105 provided on the front and rear sides of the frame 102. Core holders 106 and 107 are fixed to a bottom portion of the frame 102. A field core 108 is held by the core holders 106 and 107. The field core 108 comprises a center core 181 and side cores 182 and 183. Coils 190 and 191 are wound around the center core 181. A coil 192 is wound around the side core 182, and a coil 193 is wound around the side core 183. Oscillators 110 are provided between the center core 181 and side core 182 and between the center core 181 and side core 183. A pair of discs 111, 112 are fixed to each of both ends of each oscillator 110. A diaphragm 113, 114 is clamped between the paired discs 111, 112. The diaphragm 113, 114 has a disc shape and its rim portion is clamped by a ring 115, 116 fixed in the frame 102 and the head cover 104, 105. Specifically, both end portions of each oscillator 110 are fixed and supported on the frame 102 by means of the diaphragm 112, 113.

Compression chambers 117, 118 defined by the diaphragms 113, 114 and head covers 104, 105 are formed at both ends of the oscillator 110. A pair of inlet ports 119 for taking fluid (e.g. air) into the compression chamber 117 and a pair of inlet ports 120 for taking fluid into the compression chamber 118 are formed in walls of the compression chambers 117, 118. The inlet ports 119, 120 are provided with valves 121, 122 which are bent toward the compression chambers 117, 118 to open the inlet ports 119, 120.

On the other hand, there are provided a pair of outlet ports 123 for discharging fluid from the compression chamber 117 and a pair of outlet ports 124 for discharging fluid from the compression chamber 118. The outlet ports 123, 124 are provided with valves 125, 126 which are bent away from the compression chambers 117, 118 to open the outlet ports 125, 126.

The head covers 104, 105 are provided with inlet nipples 127, 128 for drawing fluid and outlet nipples 129, 130 for discharging fluid. Inlet chambers 131, 132 are provided between the inlet nipples 127, 128 and inlet ports 119, 120. Outlet chambers 133, 134 and communication ducts 135, 136 are provided between the outlet nipples 129, 130 and outlet ports 123, 124.

Permanent magnets 137, 138 which are arranged to have mutually opposite polarities are fixed to each oscillator 110. The polarities of the permanent magnets 137, 138 will be described later in detail. An electric AC is supplied from an AC power supply (not shown) to the coils 190, 191, 192, 193 through a cable 139. The cable 139 serving as an AC source has a circuit so connected to the coils 190, 191, 192, 193 as to obtain the directions of magnetic field as mentioned later. The pump 101 is fixed to a bracket 141 via legs 140 formed of elastic material, such as rubber, for vibro-isolation. The bracket 141 is attached to a desired place and the pump is driven.

A description will now be given of the relationship between the magnetic poles of the field core 108 and the polarities of the permanent magnets 137, 138.

Figure 3A:
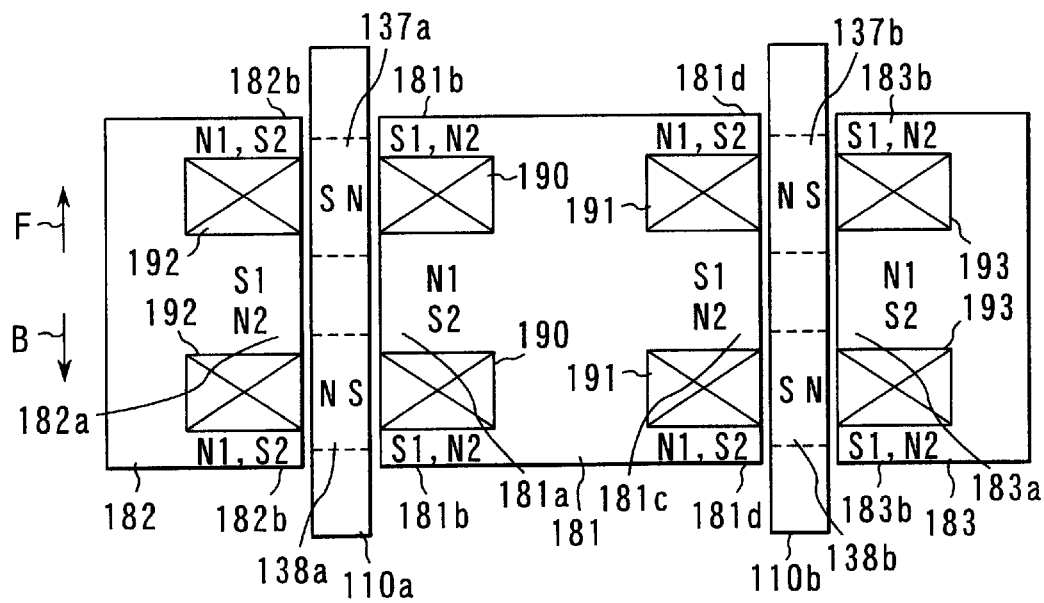
FIG. 3A shows polarities of magnetic poles of a field core used in the pump shown in FIG. 1.
Figure 3B:
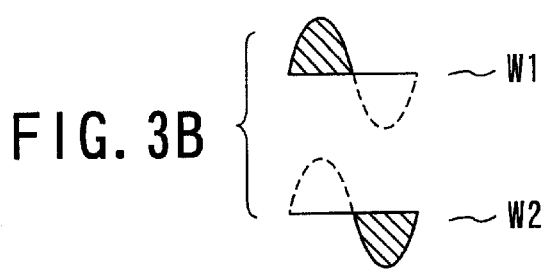
FIG. 3B shows half waves of an AC for providing the polarities shown in FIG. 3A.

FIGS. 3A and 3B show relationships between the polarities of the field core 108 and permanent magnets 137, 138 and AC waveforms. In this description, different reference numerals are assigned to the oscillators 110 and permanent magnets 137 and 138 in the two compression sections. As is shown in FIG. 3A, the permanent magnets 137a and 138a fitted in the oscillator 110a, 110b are arranged to have mutually opposite polarities. Specifically, the permanent magnets 137a and 137b have S-poles on their sides facing the side cores 182 and 183, respectively, and the permanent magnets 137a and 137b have N-poles on their sides facing the center core 181. By contrast, the permanent magnets 138a and 138b have N-poles on their sides facing the side cores 182 and 183, respectively, and the permanent magnets 138a and 138b have S-poles on their sides facing the center core 181.

The cable 139 has a circuit which is connected to the coils 190, 191, 192, 193, with the directions of the magnetic poles of the permanent magnets 137a, 137b, 138a, 138b taken into account, such that an AC is supplied to these coils to displace the oscillators 110a and 110b in opposite directions in units of a half wave of the AC.

For example, AC is supplied to the coil 192 such that the center pole 182a of the side core 182 is magnetized to have an S-pole at one half wave W1 of the AC, as shown in FIG. 3B, and an N-pole at the other half wave W2. At this time, each side pole 182b of the side core 182 is magnetized to have the opposite polarity. The polarity of the magnetic pole at the half wave W1 is indicated by adding "1" to sign N, S, and the polarity of the magnetic pole at the half wave W2 is indicated by adding "2" to sign N, S. The same indication is adopted in the descriptions below.

On the other hand, AC is supplied to the coil 190 such that the center pole 181a of the center core 181 is magnetized to have an N-pole at the half wave W1 and an S-pole at the other half wave W2, opposite to the direction of magnetization of the side core 182. At this time, the side pole 181b of the center core 181 is magnetized to have a polarity opposite to the center pole 181a.

In addition, AC is supplied to the coil 193 such that the center pole 183a of the side core 183 is magnetized to have an N-pole at the half wave W1 and an S-pole at the other half wave W2. At this time, the side pole 183b of the side core 183 is magnetized to have a polarity opposite to the center pole 183a.

On the other hand, AC is supplied to the coil 191 such that the other center pole 181c of the center core 181 is magnetized to have an S-pole at the half wave W1 and an N-pole at the other half wave W2, opposite to the direction of magnetization of the side core 183. At this time, the side pole 181d of the center core 181 is magnetized to have a polarity opposite to the center pole 181c.

Assume that AC is supplied to the coils 190, 191, 192, 193 over the cable 139 in the state in which the cable 139 is connected to obtain the above-described relationship between the AC waveforms and the directions of magnetization. As regards the oscillator 110a, for example, with the application of the half wave W1, the permanent magnet 137a is repelled by the center pole 181a of center core 181 and the center pole 182a of side core 182, while the permanent magnet 138a is attracted by the center pole 181a of center core 181 and the center pole 182a of side core 182. As a result, the oscillator 110a is displaced in the direction of arrow F.

On the other hand, with the application of the half wave W2, the permanent magnet 137a is attracted by the center pole 181a of center core 181 and the center pole 182a of side core 182, while the permanent magnet 138a is repelled by the center pole 181a of center core 181 and the center pole 182a of side core 182. As a result, the oscillator 110a is displaced in the direction of arrow B.

As regards the oscillator 110b, with the application of the half wave W1, the permanent magnet 137b is attracted by the center pole 181c of center core 181 and the center pole 183a of side core 183, while the permanent magnet 138b is repelled by the center pole 181c of center core 181 and the center pole 183a of side core 183. As a result, the oscillator 110b is displaced in the direction of arrow B.

On the other hand, with the application of the half wave W2, the permanent magnet 137b is repelled by the center pole 181c of center core 181 and the center pole 183a of side core 183, while the permanent magnet 138b is attracted by the center pole 181c of center core 181 and the center pole 183a of side core 183. As a result, the oscillator 110b is displaced in the direction of arrow F.

The operation of the pump will now be described. If AC is supplied to the coils 190, 191, 192, 193 over the cable 139, the two oscillators 110 (110a, 110b) are alternately displaced and vibrated in units of a half wave, as described above. Accordingly, the vibration frequency of the oscillator 110 is determined by the commercial frequency.

In accordance with the vibration of the oscillator 110, the diaphragms 113, 114 vibrate. With the vibration of the diaphragms 113, 114, the compression chambers 117, 118 expand and contract. When the compression chambers 117, 118 expanding, the valves 121, 122 of inlet ports 119, 120 are opened to draw fluid into the compression chambers 117, 118 via the inlet nipples 127, 128 and inlet chambers 131, 132. When the compression chambers 117, 118 contract, the valves 121, 122 are closed while the valves 125, 126 of the outlet ports 123, 124 are opened. Consequently, fluid is discharged from the compression chambers 117, 118 via the outlet chambers 133, 134 and outlet nipples 129, 130.

Since the two oscillators 110 are supplied with AC such that their directions of vibration are opposite to each other, the vibration of the entirety of the pump 101 due to the vibration of oscillators 110 is reduced by cancellation. Since the coils in the above-described pump are magnetized using all waves of the AC, power is efficiently used.

According to this embodiment, the assembly of the pump 101 is simplified and the maintenance of the pump 101 is made easier due to the decrease in number of components. Specifically, since the center core 181 is shared by the two compression sections, the number of field cores can be reduced, compared to the case where two independent pumps are coupled. Since the head covers 104, 105 are integrally formed to cover the two compression sections, disassembly is easy for exchanging the diaphragms 113, 114. In general, where a plurality of pumps are driven at the same time, it is necessary to exchange the diaphragms at a time. In this case, if a plurality of independent pumps are coupled, it would be necessary to exchange the diaphragms by removing and attaching the head covers of each pump, and this is time-consuming. However, since the head covers are shared by the plural compression sections in this embodiment, the number of head covers to be removed/attached is decreased and the work for exchange is facilitated.

Moreover, since a plurality of compression sections are contained within a single housing, the coils 190, 191, 192, 193 can be easily wired. If independent pumps each having a separate housing are to be wired, connectors are required to wire the coils, and the wiring becomes complex. This problem is overcome in the pump according to the present embodiment.

Furthermore, in the case of a pump wherein a plurality of independent pumps are coupled, buffer members need to be provided among the pumps to prevent collision of the pumps due to shock or vibration. In the pump of this embodiment wherein plural compression sections are contained in the single housing, such buffer members are not needed.

Figure 4:
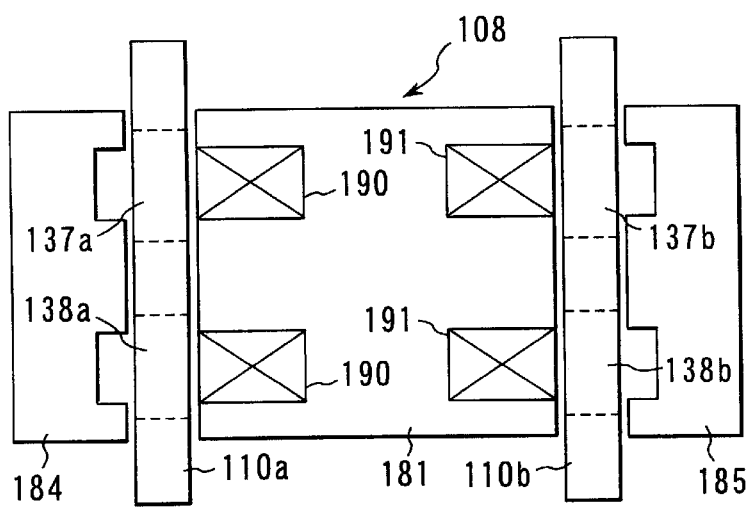
FIG. 4 is a plan view showing a modification of the field core.

Modifications of the field core 108 will now be described. FIG. 4 is a plan view showing a modification of the field core 108. Unlike the field core shown in FIG. 3, in the field core according to this modification, the side cores are replaced with back field cores 184, 185 which are not provided with coils. If AC is supplied to the coils 190, 191, magnetic fields passing through the center core 181 and back field cores 184, 185 are produced. Thus, magnetic poles for attracting/repelling the oscillators 110a, 110b are created. In this modification, the weight of the field core is reduced in accordance with the decrease in number of coils, and the space for mounting is also reduced.

Figure 5:
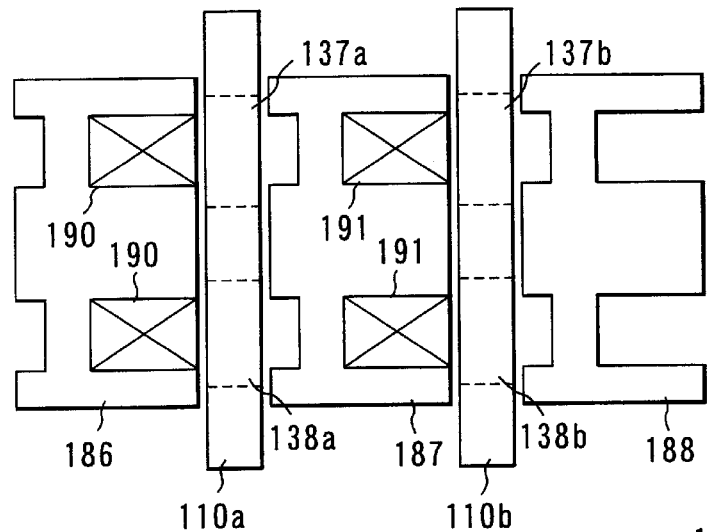
FIG. 5 is a plan view showing another modification of the field core.

FIG. 5 is a plan view showing another modification of the field core. Coils 190 and 191 are wound around field cores 186 and 187 of field cores 186, 187 and 188 which have the same shape. Like the preceding modification, the weight of the field core can be reduced. Moreover, since the field cores 186, 187 and 188 have the same shape, the field cores can be easily mass-produced.

Figure 6:
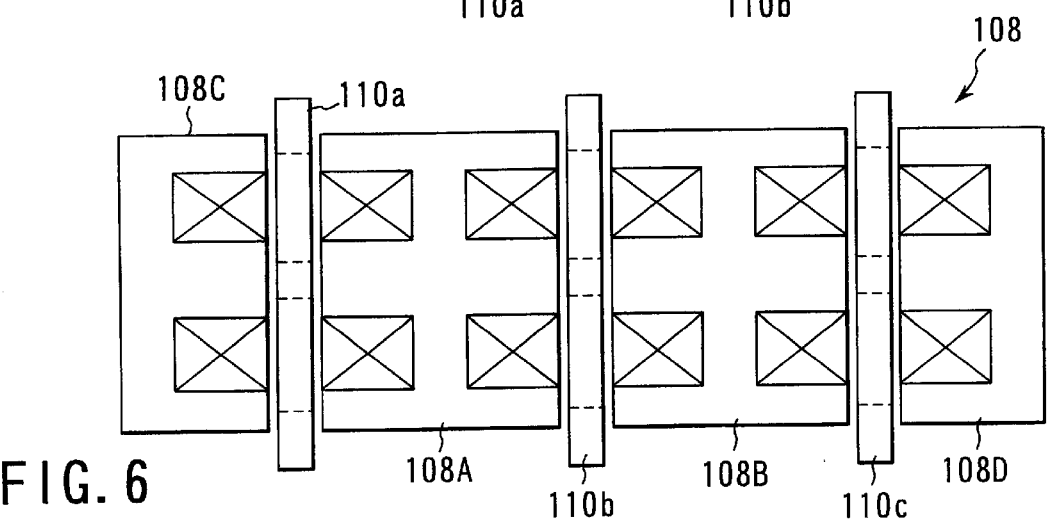
FIG. 6 is a plan view of a main part of a pump having three compression sections.

The above-described embodiment is directed to the double pump having two compression sections. This invention, however, is not limited to the double pump and may be applied to a pump having three or more compression sections. FIG. 6 is a plan view of a main part of a triple pump having three compression sections. In FIG. 6, a field core 108 comprises first and second center cores 108A and 108B each having two coils, and side cores 108C and 108D each having a single coil which are arranged at both ends of the field core 108. An oscillator 110b is disposed between the center core 108A and center core 108B, an oscillator 110a between the center core 108A and side core 108C, and an oscillator 110c between the center core 108B and side core 108D. This modification is constructed such that both side oscillators 110a and 110c are urged in the same direction by the same half wave of the applied AC, and the central oscillator 110b is urged by the other half wave of the AC in a direction opposite to the oscillators 110a and 110c.

With the increase in number of compression sections coupled, a greater discharge amount is obtained. The discharge amount, however, can be controlled by providing change-over switches on lines connected to the coils wound around the field cores so as to selectively urge the oscillators of the plural compression sections.

Figure 7:
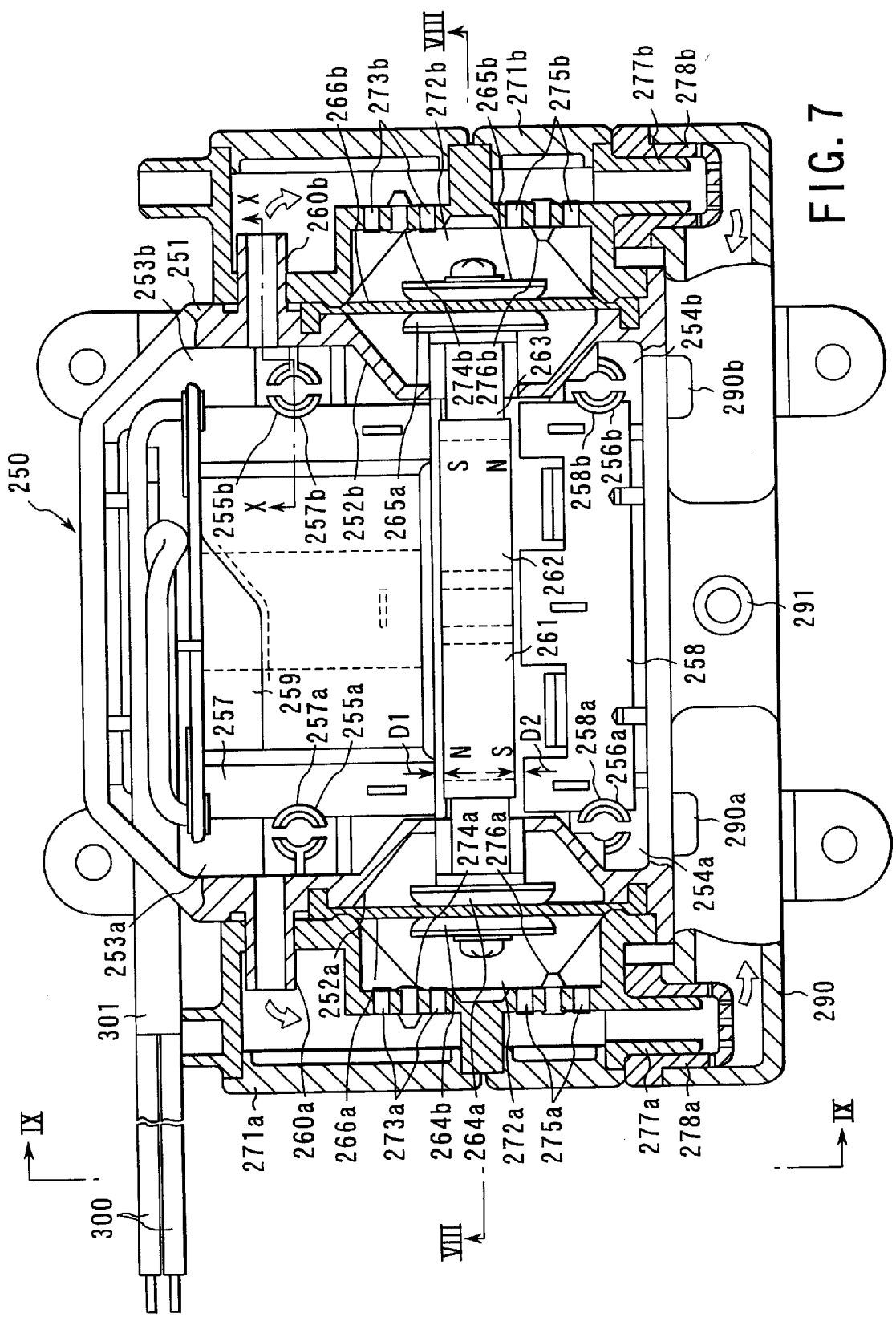
FIG. 7 is a cross-sectional view showing another preferred embodiment of the present invention.
Figure 8:
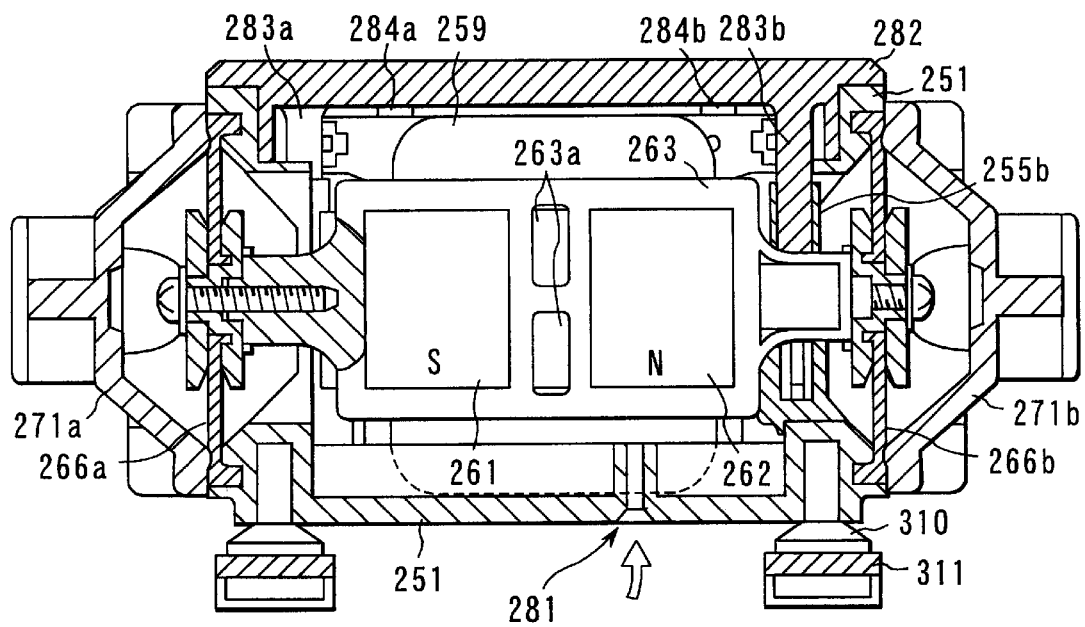
FIG. 8 is a cross-sectional view taken along line VIII—VIII in FIG. 7.
Figure 9:
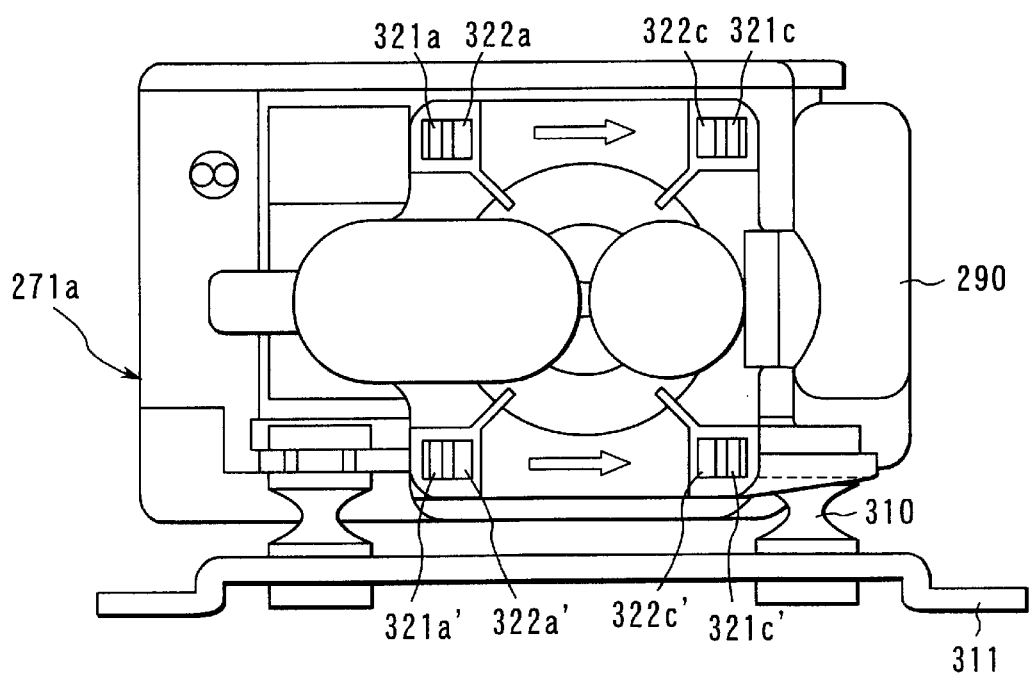
FIG. 9 is a front view of a head cover, as viewed in a direction of line IX—IX in FIG. 7.

FIGS. 7 to 9 show the whole structure of an electromagnetic diaphragm pump according to another preferred embodiment of the present invention.

As is shown in the figures, a pump 250 includes a housing 251 having four peripheral side walls and a bottom wall integrally formed of a synthetic resin, etc. The right and left side walls (in FIG. 7) of the housing 251 are provided with internally projecting fan-shaped diaphragm receiving walls 252a, 252b. A hole of, e.g. a rectangular shape for passing an oscillator (to be described later) is formed in a central bottom portion of the diaphragm receiving wall 252a, 252b. Mount portions 253a, 353b; 254a, 354b each with a small area are formed on right and left sides to be continuous with the four corners of the bottom wall of the housing 251. Slitted ribs 255a, 255b; 256a, 256b extending upward are erected on these mount portions. Each slitted rib is hollow and divided into two portions along its longitudinal direction. When a boss is inserted in the rib from above, the rib is resiliently extended outward and the rib clamps the boss by the resultant resilient force. Head covers 271a, 271b are fixed to the left and right side walls of the housing 251 by means of hooks, and not screws as in the prior art, as will be described later in detail.

An E-shaped main core 257 and an E-shaped back core 258, which constitute a field core, are disposed within the housing 251 such that a predetermined distance is provided between the main core 257 and back core 258 for provision of an oscillator (to be described later) and central leg portions of E-structures and both side leg portions producing both side poles are mutually opposed. The central leg portion of the E-shaped main core 257 is formed as a winding core portion on which a coil 259 is wound, but no coil is wound around the central leg portion of the back core 258. Left and right outside portions of the E-shaped main core 257 and E-shaped back core 258 are provided with arcuated grooves 257a, 257b; 258a, 258b having the same shapes as peripheral portions of the slitted ribs. When the E-shaped main core 257 and E-shaped back core 258 are to be received in the housing 251, the cores 257 and 258 are put in the housing 251 such that the arcuated grooves 257a, 257b; 258a, 258b may come in contact with the outer peripheral portions of the slitted ribs and the bottom surfaces of the cores may be seated on parts of the mounting portions 253a, 253b; 254a, 254b.

An oscillator 263 with a rectangular cross section, to which two permanent magnets 261, 262 are fixed with windows 263a formed therebetween, is disposed between the E-shaped main core 257 and E-shaped back core 258. A pair of first and second center plates 264a, 264b; 265a, 265b are fixed to each of both ends of the oscillator 263. A diaphragm 266a is clamped between the first and second center plates 264a, 264b, and a diaphragm 266b between the first and second center plates 265a, 265b. The diaphragm 266a, 266b has a disc shape, and an outer peripheral portion, i.e. a rim portion, thereof is clamped between a peripheral annular portion of the diaphragm receiving wall 252a, 252b and the head cover 271a, 271b. Specifically, both end portions of the oscillator 263 are fixed and supported in the housing 251 by means of the diaphragms 266a, 266b.

Compression chambers 272a, 272b defined respectively by the diaphragm 266a and head cover 271a and by the diaphragm 266b and head cover 271b are provided at both ends of the oscillator 263. A pair of inlet ports 273a, 273b for drawing air into the compression chamber 272a, 272b are formed in a wall of the compression chamber 272a, 272b. The inlet ports 273a, 273b are provided with valves 274a, 274b which are bent toward the compression chamber 272a, 272b to open the inlet ports 273a, 273b. On the other hand, a pair of outlet ports 275a, 275b for discharging air from the compression chamber 272a, 272b are formed in the wall of the compression chamber 272a, 272b. The outlet ports 275a, 275b are provided with valves 276a, 276b which are bent away from the compression chamber 272a, 272b to open the outlet ports.

Two fluid inlets 281 (see FIG. 8) for taking in fluid (e.g. air) are formed in the bottom portion of the housing 251. Fluid taken in from the fluid inlets 281 is guided to the inlet ports 273a, 273b via guides 260a, 260b formed integral with the housing 251 and inlet chambers. On the other hand, fluid forced out of the outlet ports 275a, 275b is guided into a buffer vessel 290 via outlet nipples 277a, 277b provided on the head covers 271a, 271b and gaskets 278a, 278b fitted on the outlet nipples 277a, 277b. Pulsation of the fluid coming out of the outlet nipples 277a, 277b is damped in the buffer vessel 290, and the fluid is 31 discharged from an outlet 291.

A cap 282 is mounted on a top portion of the housing 251, as shown in FIG. 8. The cap 282 is mounted such that four bosses 283a to 283d (283a, 283b alone being shown) erected on a lower surface of the cap 282 are inserted in the slitted ribs 255a, 255b, 256a, 256b and hooks 284a, 284d (284a, 284b alone being shown) are engaged in engagement holes formed in the housing 251.

An AC is supplied from an AC power supply (not shown) to the coil 259 through a cable 300. The cable 300 is covered with a protection tube 301. The cable 300 is introduced into the pump 250 and connected to the coil 259 within the pump 250. The cable 300 serves as an AC source.

The pump 250 is fixed to a bracket 311 via legs 310 formed of elastic material, such as rubber, for vibro-isolation. The bracket 311 is attached to a desired place and the pump is driven.

When an AC with a commercial power frequency is supplied to the coil 259 over the cable 300, the pump starts to operate. With the supply of AC, the mutually opposed both-side portions of the E-shaped main core 267 and back core 258 are caused to have magnetic poles alternately with polarities for attracting and repelling the permanent magnets 261, 262 fixed to the oscillator 263. The oscillator 263 vibrates in the right-and-left direction at the aforementioned commercial power frequency. In accordance with the vibration, the diaphragms 266a, 266b compress the fluid in the compression chambers 272a, 272b, and the compressed fluid is discharged via the outlet ports 275a, 275b and outlet nipples 277a, 277b.

In the pump 250 of this embodiment, the drive mechanism for the oscillator 263 is constituted by the paired electromagnets, that is, the E-shaped main core 257 with the coil 259 and the back core 258 without a coil. The length of each leg portion of the back core 258, which projects toward the oscillator 263, is made less than the length of each leg portion of the E-shaped main core 257. In this embodiment, the length of each leg portion of the back core 258 is set at, e.g. about ½ of the length of each leg portion of the E-shaped main core 257. Thereby, the size of the housing 251 in the pump 250 is greatly reduced, compared to the conventional apparatus, and the weight and manufacturing cost of the pump can be decreased.

According to the above structure, the magnetic force produced from the E-shaped main core 257 on which the coil 259 is wound is greater than the magnetic force induced from the back core 258 on which no coil is wound. To solve this problem, in the present embodiment, a distance D1 (see FIG. 7) between the E-shaped main core 257 and oscillator 263 is made greater than a distance D2 between the back core 258 and oscillator 263. Thus, the E-shaped main core 257 and back core 258 can have substantially equal attractive forces for attracting, and repulsive forces for repelling, the permanent magnets 261, 262 fixed to the oscillator 263. For example, the distance D1 between the E-shaped main core 257 and oscillator 263 is set at about 1.5 times the distance D2 between the back core 258 and oscillator 263. Thereby, the oscillator 263 is neither inclined to the E-shaped main core 257 nor the back core 258, and the oscillator 263 can be vibrated in a well-balanced manner between the E-shaped main core 257 and back core 258. Radial non-uniform force due to the oscillator 263 is not caused on the diaphragms 266a, 266b which support both end portions of the oscillator 263, and the life of the diaphragm 266a, 266b is increased. Moreover, the diaphragm 266a, 266b can be smoothly vibrated, and the output efficiency of compressed fluid enhanced.

Figure 10:
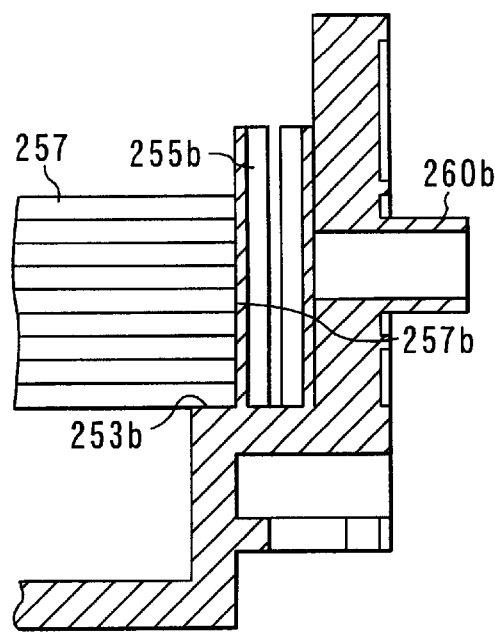
FIG. 10 is a view taken along line X—X in FIG. 7.

FIG. 10 is a cross-sectional view taken along line X—X in FIG. 7. FIG. 10 shows a positional relationship among the slitted rib 255b, mounting portion 253b and E-shaped main core 257 seated on the mounting portion 253b. The groove 257b having the shape corresponding to the part of the outer periphery of the slitted rib 255b is formed at that portion of the outer side surface of E-shaped main core 257, which comes in contact with the slitted rib 255b. The same grooves 257a, 258a, 258b are formed at that portion of the outer side surface of E-shaped main core 257, which comes in contact with the slitted rib 255a, and those portions of the outer side surface of back core 258, which come in contact with the slitted ribs 256a, 256b.

Figure 11:
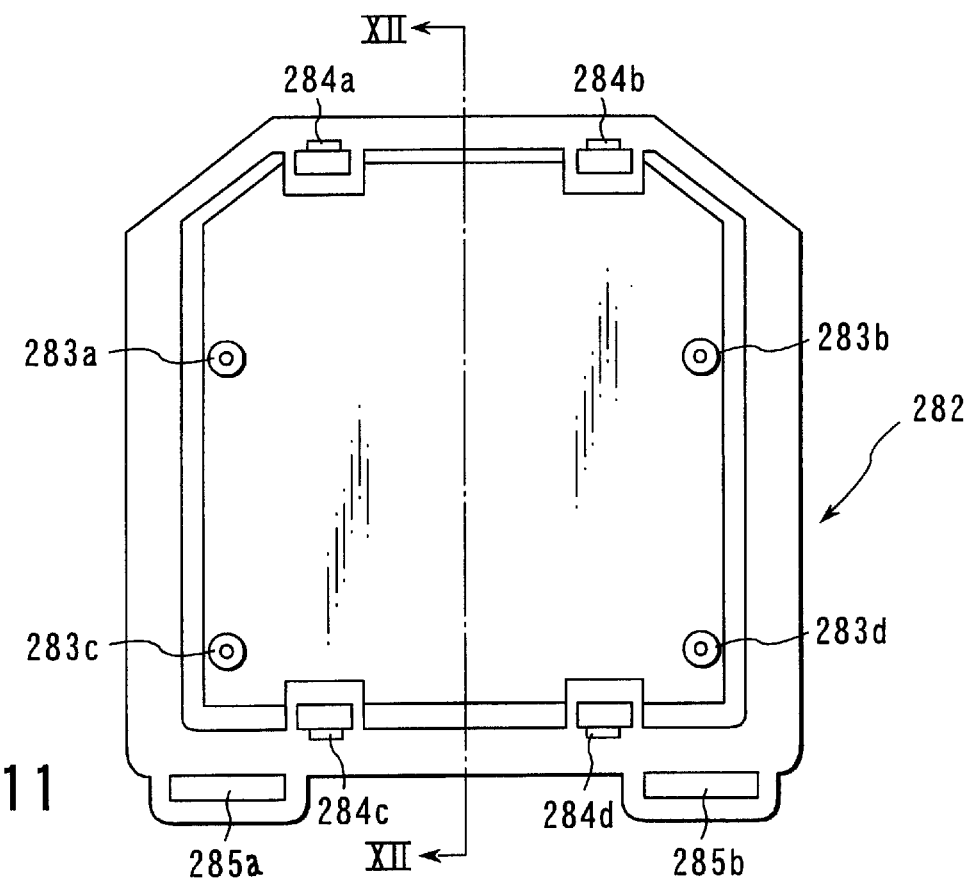
FIG. 11 is a bottom view of a cap attached to the pump shown in FIG. 7, as viewed from the inside of the pump.
Figure 12:
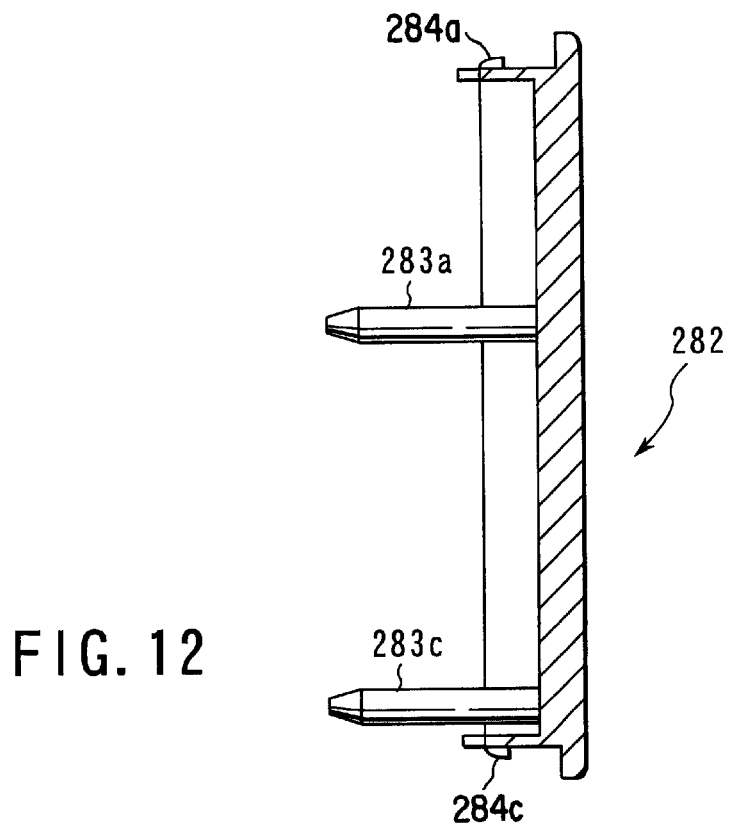
FIG. 12 is a cross-sectional view taken along line XII—XII in FIG. 11.
Figure 14A:
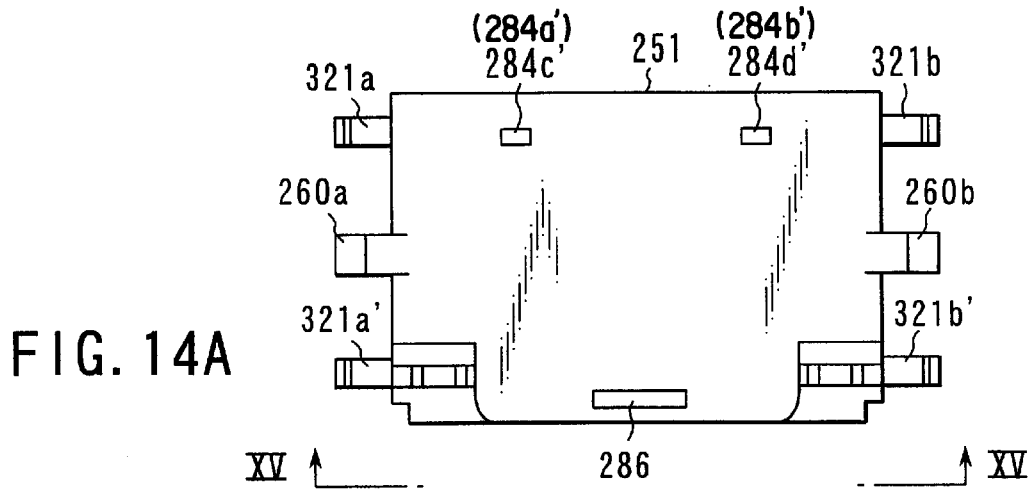
FIG. 14A is a view taken in a direction of line XIVA—XIVA in FIG. 13.

As is shown in FIGS. 11 and 12, the cap 282 has a substantially rectangular shape. The cap 282 has bosses 283a, 283b, 283c, 283d at locations corresponding to the slitted ribs 255a, 255b, 256a, 256b shown in FIG. 7. The cap 282 has hooks 284a, 284b, 284c, 284d at predetermined locations near the four corners of the substantially rectangular shape. When the cap 282 is to be mounted on the pump 250, the bosses 283a, 283b, 283c, 283d are positioned to be inserted in the hollow portions of the slitted ribs 255a, 255b, 256a, 256b, as shown in FIG. 8. Then, the cap 282 is pushed onto the housing 251. Then, the cap 282 is secured to the housing 251 by the forces exerted by the slitted ribs 255a, 255b, 256a, 256b to clamp the bosses 283a, 283b, 283c, 283d and by the engagement between the hooks 284a, 284b, 284c, 284d and engagement holes 284a', 284b', 284c', 284d' (see FIG. 14A).

In this case, the slitted ribs 255a, 255b, 256a, 256b are extended outward by the insertion of the bosses 283a, 283b, 283c, 283d. Then, the slitted ribs 255a, 255b, 256a, 256b enter the grooves 257a, 257b; 258a, 258b of the E-shaped main core 257 and back core 258, and strongly clamp the E-shaped main core 257 and back core 258 from both sides, as clearly shown in FIG. 7. As a result, the E-shaped main core 257 and back core 258 are clamped respectively between the slitted ribs 255a, 255b and between the slitted ribs 256a, 256b and secured to the housing 251. Reference numerals 285a and 285b in FIG. 11 denote engagement holes for engagement with projections 290a and 290b (see FIG. 7) provided on an upper part of the buffer vessel 290.

Figure 19:
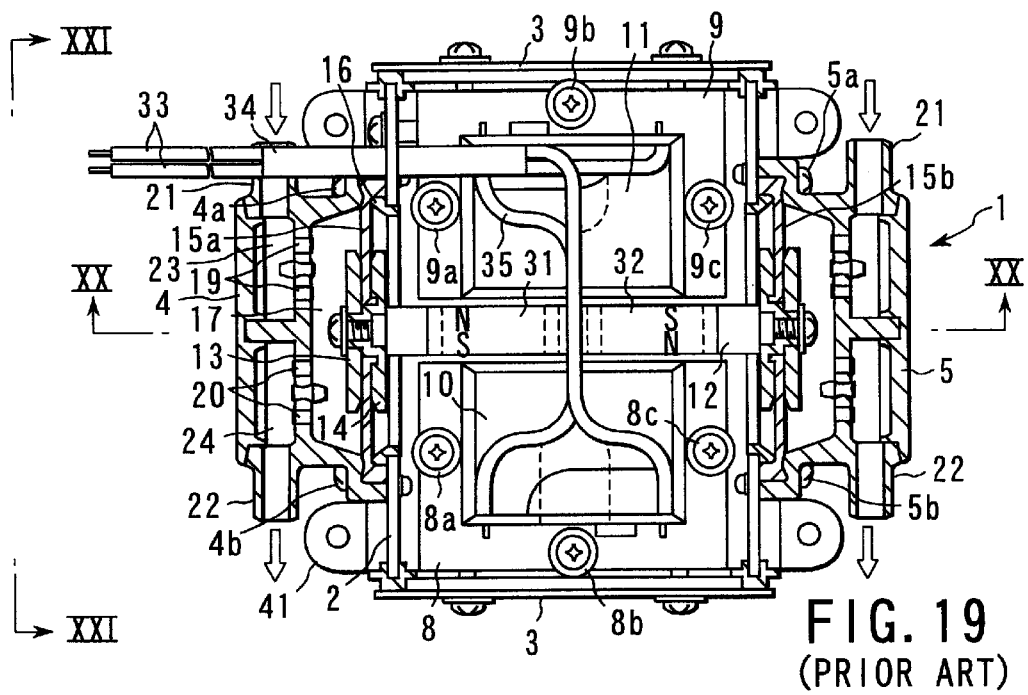
FIG. 19 is a cross-sectional plan view of a conventional pump.
Figure 20:
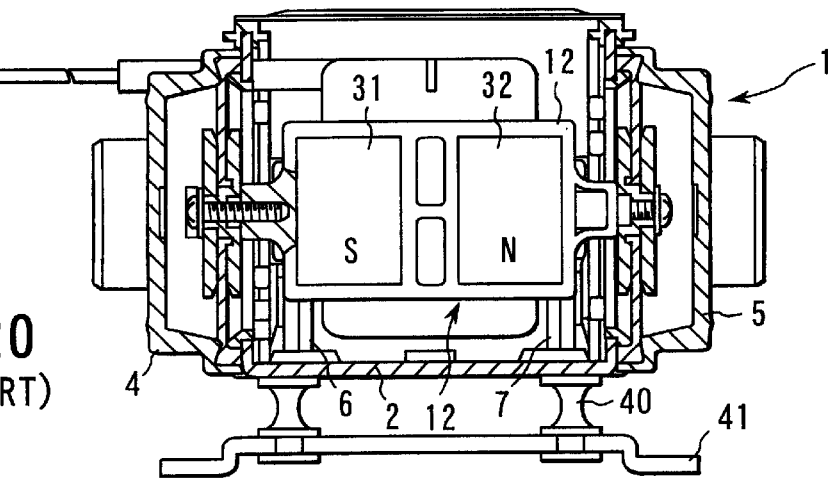
FIG. 20 is a cross-sectional side view taken along line XX—XX in FIG. 19.
Figure 21:
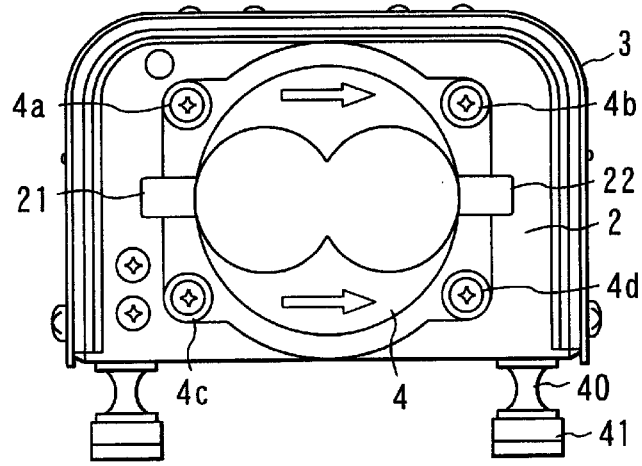
FIG. 21 is a side view taken in a direction of line XXI—XXI in FIG. 19.

According to the present embodiment, the cap 282, E-shaped main core 257 and back core 258 can be secured to the housing 251 without using screws. Unlike the prior art, there is no need to form holes in the E-shaped main core 257 and back core 258 for insertion of the screws 8a–8c, 9a–9c (see FIG. 19) used in the conventional apparatus. Thus, the E-shaped main core 257 and back core 258 can efficiently guide magnetic fluxes and produce magnetic force. In other words, a magnetic force equal to that in the prior art can be produced using E-shaped main core 257 and back core 258 which are smaller in size than in the prior art.

Figure 13:
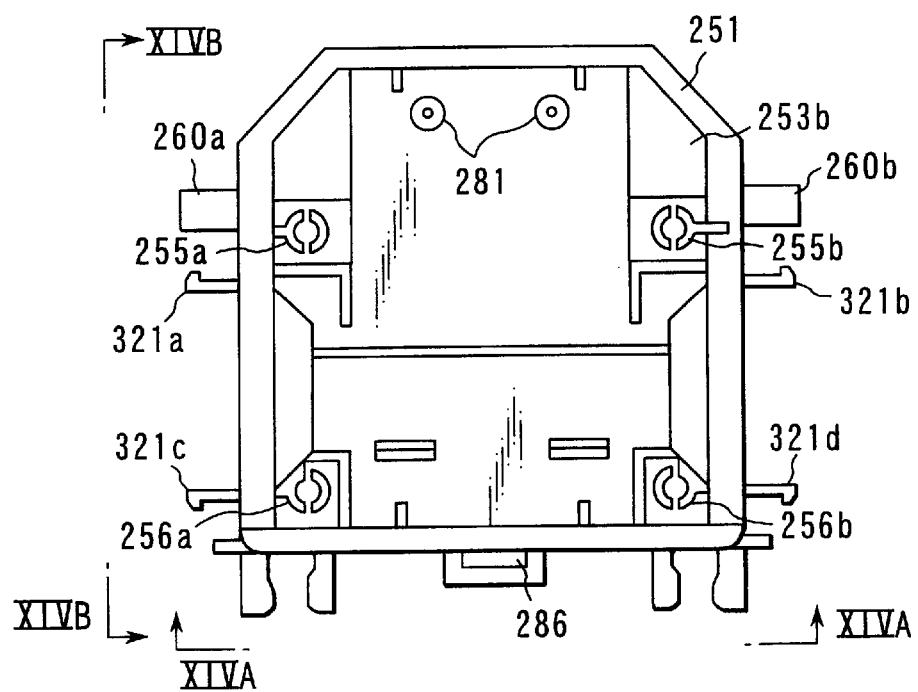
FIG. 13 is a plan view showing an internal structure of a housing of the pump shown in FIG. 7.
Figure 14B:
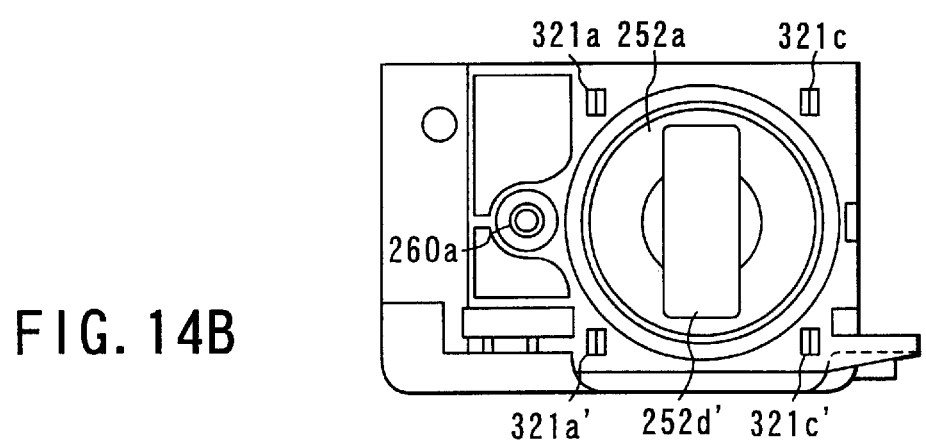
FIG. 14B is a view taken in a direction of line XIVB—XIVB in FIG. 13.
Figure 15:
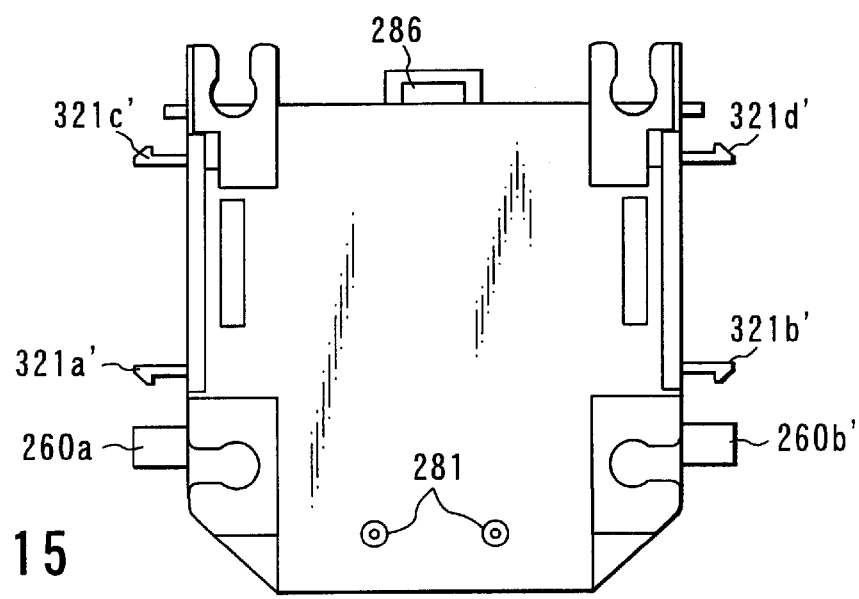
FIG. 15 is a bottom view of a cap, as viewed in a direction of line XV—XV in FIG. 14A.

The shape of the housing 251 will now be described with reference to FIGS. 13 to 15. The same reference numerals as in FIGS. 7 to 9 denote the same or similar elements.

As is shown in the figures, one guide 260a, 260b and four hooks 321a, 321c, 321a', 321c'; 321b, 321d, 321b', 321d' are integrally formed on each of left and right side walls of the housing 251 such that they project outward. Numeral 286 denotes an engagement hole for engagement with a projection formed on the lower surface of the buffer vessel 290 near the housing 251. As is clear from FIG. 14B, a rectangular hole 252a' for passing the oscillator 263 is formed in a central portion of the diaphragm receiving wall 252a. In the conventional apparatus, this hole is formed in accordance with the dimensions of the outer periphery of the diaphragm receiving wall 252a. In this embodiment, however, the hole 252a' is formed to have a small area enough to pass the oscillator 263. A rectangular hole with the same area is also formed in the right-side diaphragm receiving wall 252b of housing 251. By virtue of this structure, vibration noise of the diaphragm 266a, 266b, which enters the inside of the housing 251, i.e. the chamber containing the E-shaped main core 257, back core 258, etc., can be reduced as much as possible. As a result, vibration noise of the diaphragm 266a, 266b, which propagates through this chamber to the outside of the housing 251, can be reduced as much as possible, and a silent pump can be provided.

Figure 16:
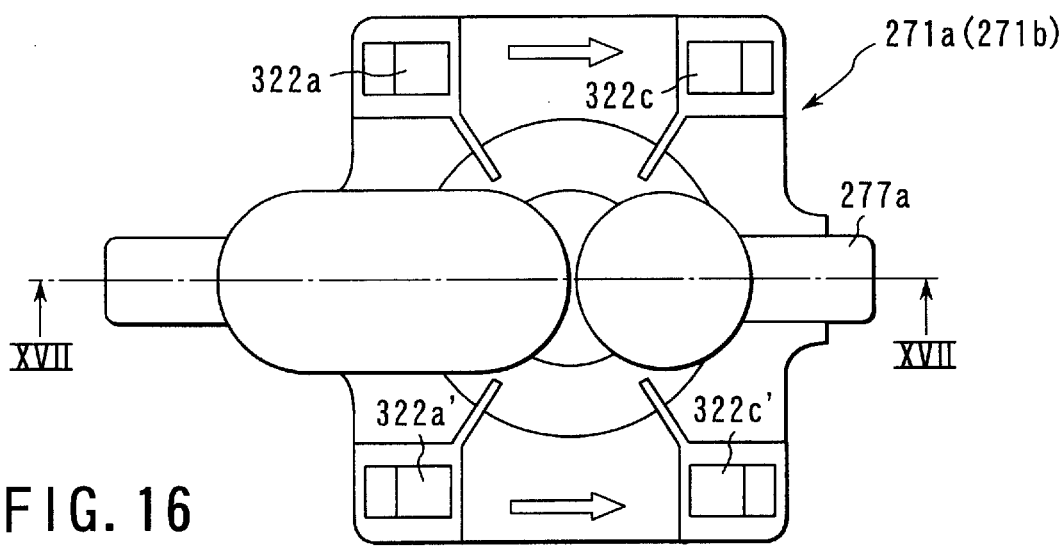
FIG. 16 is a front view of the head cover used in the pump shown in FIG. 7.
Figure 17:
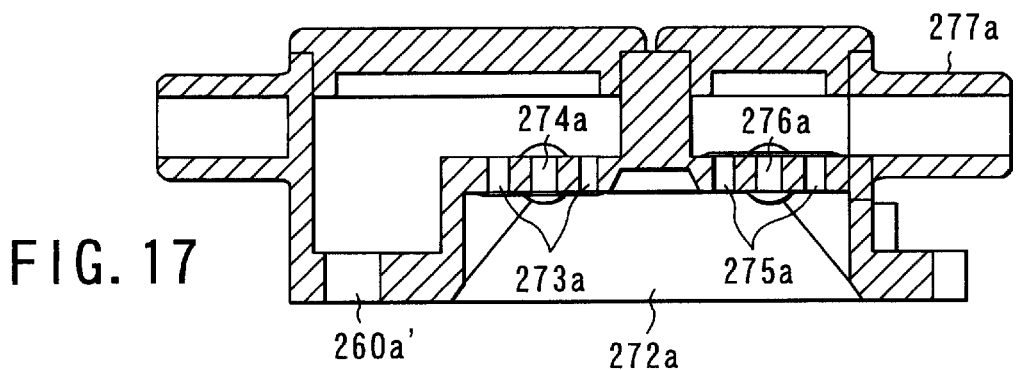
FIG. 17 is a cross-sectional view taken along line XVII—XVII in FIG. 16.

FIGS. 16 and 17 show the head cover 271a coupled to the left-hand side wall of housing 251. Since the head cover 271b coupled to the right-hand side wall of housing 251 has the same structure, a description thereof is omitted.

As is shown in FIG. 16, hook reception holes 322a, 322c, 322a', 322c' for receiving the four hooks 321a, 321c, 321a', 321c' provided on the side wall of housing 251 are formed at four corners of the head cover 271a. As is clear from FIG. 17, a guide insertion hole 260a' for insertion of the guide 260a is formed in the wall continuous with the inlet ports 273a. The size of the guide insertion hole 260a' is slightly greater than the outside diameter of the guide 260a.

When the head cover 271a is to be coupled to the side wall of the housing 251, the hook reception holes 322a, 322c, 322a', 322c' of the head cover 271a are aligned with the four hooks 321a, 321c, 321a', 321c' provided on the housing 251. The head cover 271a is then pushed onto the side wall of the housing 251. Thus, the guide 260a is brought to the guide insertion hole 260a' and the hooks 321a, 321c, 321a', 321c' reach the hook reception holes 322a, 322c, 322a', 322c' of the head cover 271a. Subsequently, if the head cover 271a is further pushed to the side wall of the housing 251, the hooks 321a, 321c, 321a', 321c' are resiliently engaged in the hook reception holes 322a, 322c, 322a', 322c' and fixed by hooking. According to the present embodiment, the head cover 271a, 271b can be fixed to the side wall of the housing 251 without using any screw which is used in the conventional apparatus.

Figure 18A:
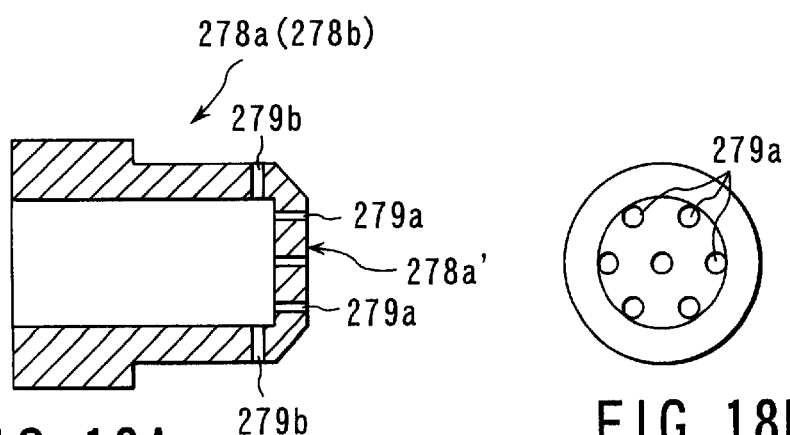
FIG. 18A is a cross-sectional view of a gasket used in the pump shown in FIG. 7.
Figure 18B:
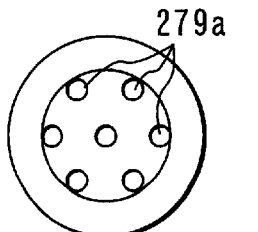
FIG. 18B is a front view of the gasket.

FIGS. 18A and 18B show a modification of the gasket 278a, 278b fitted on the distal end portion of the outlet nipple 277a, 277b. As is shown in the figures, the gasket 278a, 278b has a bottomed cylindrical shape and, for example, seven small holes 279a are formed in a closed-end bottom portion 278a'. In addition, for example, two small holes 279b are formed in a wall portion near the closed-end bottom portion. By virtue of the nine holes in total formed in the bottom portion and side wall portion, the output fluid is smoothly drawn into the buffer vessel 290. In this modification, the small holes are formed in the gasket 278a, 278b. Thus, compared to the conventional structure wherein no gasket is provided on the bottom portion 278a', beat noise of valves, which is transmitted when the compressed fluid flows to the buffer vessel 90 through the outlet nipple 277a, 277b, can be reduced and a silent pump is provided.

As has been described above, according to the present embodiment, the electromagnets contained in the pump are provided only on one side of the oscillator. On the other side of the oscillator, the back core with no coil, which has about half the width of the core of the electromagnets, is disposed. Therefore, the pump can be reduced in weight and size. In addition, by virtue of the reduction in size, the buffer vessel, which is connected to the pump via the pipe in the prior art, can be integrally connected to the pump via the gasket without the pipe.

Furthermore, since the E-shaped main core, back core, cap or head cover can be fixed to the housing using the slitted ribs or hooks, there is no need to use screws which are required in the prior art. Besides, since the area of the oscillator pass hole in the diaphragm receiving wall is reduced and the gasket with holes is fitted on the outlet gasket, a very silent pump can be provided, compared to the conventional pumps.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electromagnetic diaphragm pump having an AC power supply and a plurality of compression sections operated by an AC supplied from the AC power supply, each of the compression sections comprising:

a housing;

an oscillator disposed within the housing and holding a permanent magnet;

a pair of diaphragms each having a peripheral portion fixed to said housing and a central portion fixed to an end portion of the oscillator, each of the diaphragms supporting the oscillator so as to be able to vibrate in a direction perpendicular to a plane in which the diaphragm is disposed;

a pair of field cores sandwiching the oscillator and having magnetic poles displaced relative to the permanent magnet by a predetermined amount in a direction of vibration of the oscillator;

coils wound around one of said pair of field cores, wherein said coils are supplied with an AC from the AC supply to produce magnetic fluxes at said field cores;

compression chambers defined within the housing to be opposed to end portions of the oscillator, one of walls of each of the compression chambers being formed by an associated one of said diaphragms; and inlet ports with valves capable of drawing air into the compression chamber and outlet ports with valves capable of forcing air out of the compression chamber, the inlet ports and outlet ports being formed within the housing, wherein said field cores have the magnetic poles magnetized by the AC supplied to the coils, whereby the permanent magnet is alternately attracted and repelled by the magnetic poles to vibrate the diaphragms, adjacent two of the compression sections have one shared field core, said plurality of compression sections have a shared housing and said shared housing has head covers integrally covering a plurality of said diaphragms or adjacent ones on the compression sections and constituting the other walls of the compression chambers of said adjacent compression sections, and said inlet ports and said outlet ports are formed in said head covers.

2. An electromagnetic diaphragm pump according to claim 1, wherein said AC supply has a circuit for supplying half waves of the AC to the coils such that at least one of said plurality of oscillators is displaced in a direction opposite to the other oscillators.

3. An electromagnetic diaphragm pump having an AC power supply and at least one compression section operated by an AC supplied from the AC power supply, the compression section comprising:

a housing;

an oscillator disposed within the housing and holding a permanent magnet;

a pair of diaphragms each having a peripheral portion fixed to said housing and a central portion fixed to an end portion of the oscillator so as to be able to vibrate in a direction perpendicular to a plane in which the diaphragm is disposed;

a pair of field cores sandwiching the oscillator and having magnetic poles displaced relative to the permanent magnet by a predetermined amount in a direction of vibration of the oscillator;

a coil supplied with an AC to produce a magnetic flux at said field core;

compression chambers defined within the housing to be opposed to end portions of the oscillator, one of walls of each of the compression chambers being formed by an associated one of said diaphragms; and inlet ports with valves capable of drawing air into the compression chamber and outlet ports with valves capable of forcing air out of the compression chamber, the inlet ports and outlet ports being formed within the housing, wherein said field cores have the magnetic poles magnetized by the AC supplied to the coil, whereby the permanent magnet is alternately attracted and repelled by the magnetic poles to vibrate the diaphragms, and said pair of field cores comprise an E-shaped main core around which the coil is wound and which has a central leg portion, and an E-shaped back core around which no coil is wound, said E-shaped back core being disposed to be opposed to said E-shaped main core, each of said main core and said back core has a leg portion projecting towards the oscillator, the leg portion of said main core having a length greater than a length of said leg portion of the back core.

4. An electromagnetic diaphragm pump according to claim 3, wherein a distance between said main core and said oscillator is greater than a distance between said back core and said oscillator.

5. An electromagnetic diaphragm pump having an AC power supply and at least one compression section operated by an AC supplied from the AC power supply, the compression section comprising:

a housing;

an oscillator disposed within the housing and holding a permanent magnet;

a pair of diaphragms each having a peripheral portion fixed to said housing and a central portion fixed to an end portion of the oscillator so as to be able to vibrate in a direction perpendicular to a plane in which the diaphragm is disposed;

a pair of field cores sandwiching the oscillator and having magnetic poles displaced relative to the permanent magnet by a predetermined amount in a direction of vibration of the oscillator;

a coil supplied with an AC to produce a magnetic flux at said field core;

compression chambers defined within the housing to be opposed to end portions of the oscillator, one of walls of each of the compression chambers being formed by an associated one of said diaphragms;

inlet ports with valves capable of drawing air into the compression chamber and outlet ports with valves capable of forcing air out of the compression chamber, the inlet ports and outlet ports being formed within the housing, wherein said field cores have the magnetic poles magnetized by the AC supplied to the coil, whereby the permanent magnet is alternately attracted and repelled by the magnetic poles to vibrate the diaphragms, said pair of field cores comprise an E-shaped main core around which the coil is wound and which has a central leg portion, and an E-shaped back core around which no coil is wound, said E-shaped back core being disposed to be opposed to said E-shaped main core, wherein said housing including a plurality of side walls, a bottom wall, and a plurality of slitted ribs extending from said bottom wall near said side walls, the pump further comprises a cap having a plurality of downwardly extending bosses formed at locations corresponding to said slitted ribs, and said slitted ribs clamp at least one of the main core and the back core when said bosses of the cap are inserted in said slitted ribs of the housing.

6. An electromagnetic diaphragm pump according to claim 5, wherein said main core and said back core have, at their portions coming in contact with the slitted ribs, grooves extending in the same direction as the slitted ribs and having shapes corresponding to shapes of parts of outer peripheral portions of said slitted ribs.

7. An electromagnetic diaphragm pump according to claim 5, wherein said cap has a plurality of hooks at a peripheral portion thereof, said hooks extending in the same direction as the slitted ribs, said cap being secured to the housing by means of the hooks.

8. An electromagnetic diaphragm pump having an AC supply and at least one compression section operated by an AC supplied from the AC supply, the compression section comprising:

a housing;

an oscillator disposed within the housing and holding a permanent magnet;

a pair of diaphragms each having a peripheral portion fixed to said housing and a central portion fixed to an end portion of the oscillator, each of the diaphragms supporting the oscillator so as to be able to vibrate in a direction perpendicular to a plane in which the diaphragm is disposed;

a pair of field cores sandwiching the oscillator and having magnetic poles displaced relative to the permanent magnet by a predetermined amount in a direction of vibration of the oscillator;

a coil supplied with an AC to produce magnetic fluxes at said field cores;

compression chambers defined within the housing to be opposed to end portions of the oscillator, one of walls of each of the compression chambers being formed by an associated one of said diaphragms; and inlet ports with valves capable of drawing air into the compression chamber and outlet ports with valves capable of forcing air out of the compression chamber, the inlet ports and outlet ports being formed within the housing, said field cores having the magnetic poles magnetized by the AC supplied to the coil, whereby the permanent magnet is alternately attracted and repelled by the magnetic poles to vibrate the diaphragms, said housing including opposed side walls and a plurality of hooks extending outward from said side walls to accommodate said oscillator, said field cores and said coil and the pump further comprising head covers coupled to the opposed side walls of the housing, said head covers having hook receiving holes at locations opposed to the hooks formed on the housing, said head covers being coupled to the housing when the hooks are inserted in the hook receiving holes, wherein said housing has guides extending from said opposed side walls in the same direction as said hooks and functioning as fluid inlets, and said guides guide the head covers when the head covers are coupled to the housing.

9. An electromagnetic diaphragm pump having an AC supply and at least one compression section operated by an AC supplied from the AC supply, the compression section comprising:

a housing;

an oscillator disposed within the housing and holding a permanent magnet;

a pair of diaphragms each having a peripheral portion fixed to said housing and a central portion fixed to an end portion of the oscillator, each of the diaphragms supporting the oscillator so as to be able to vibrate in a direction perpendicular to a plane in which the diaphragm is disposed;

a pair of field cores sandwiching the oscillator and having magnetic poles displaced relative to the permanent magnet by a predetermined amount in a direction of vibration of the oscillator;

a coil supplied with an AC to produce magnetic fluxes at said field cores;

compression chambers defined within the housing to be opposed to end portions of the oscillator, one of walls of each of the compression chambers being formed by an associated one of said diaphragms; and inlet ports with valves capable of drawing air into the compression chamber and outlet ports with valves capable of forcing air out of the compression chamber, the inlet ports and outlet ports being formed within the housing, the magnetic poles being magnetized by the AC supplied to the coil, whereby the permanent magnet is alternately attracted and repelled by the magnetic poles to vibrate the diaphragms, said housing including opposed side walls to accommodate said oscillator, said field cores and said coil;

head covers coupled to the opposed side walls of the housing and having outlet nipples for discharging compressed fluid;

a buffer vessel directly connectable to the outlet nipples; and gaskets attached to said outlet nipples and each having a bottom wall and a side wall, at least one of said bottom wall and said side wall of each of said gaskets having a plurality of small holes.

10. An electromagnetic diaphragm pump having an AC supply and at least one compression section operated by an AC supplied from the AC supply, the compression section comprising:

a housing;

an oscillator disposed within the housing and holding a permanent magnet;

a pair of diaphragm each having a peripheral portion fixed to said housing and a central portion fixed to an end portion of the oscillator, each of the diaphragms supporting the oscillator so as to be able to vibrate in direction perpendicular to a plane in which the diaphragm is disposed;

a pair of field cores sandwiching the oscillator and having magnetic poles displaced relative to the permanent magnet by a predetermined amount in a direction of vibration of the oscillator, a coil wound around one of said pair of field cores, wherein said coil is supplied with an AC to produce magnetic fluxes at said field cores;

compression chambers defined within the housing to be opposed to end portions of the oscillator, one of walls of each of the compression chambers being formed by an associated one of said diaphragms; and inlet ports with valves capable of drawing air into the compression chamber and outlet ports with valves capable of forcing air out of the compression chamber, the inlet ports and outlet ports being formed within the housing, the magnetic poles being magnetized by the AC supplied to the coil, whereby the permanent magnet is alternately attracted and repelled by the magnetic poles to vibrate the diaphragms, said housing including opposed side walls to accommodate said oscillator, said field cores and said coil, and said oscillator has end portions penetrating said side walls, said side walls have diaphragm receiving walls for receiving the diaphragms fixed to the end portions of the oscillator, and each of said diaphragm receiving walls has an opening with the same size as a cross section of the oscillator and is communicated to an inner space of said inner housing.

* * * * *

UNITED STATES PATENT AND TRADEMARK OFFICE
CERTIFICATE OF CORRECTION

PATENT NO.    : 6,382,935 B1
DATED         : May 7, 2002
INVENTOR(S)   : Mikiya et al.

It is certified that error appears in the above-identified patent and that said Letters Patent is hereby corrected as shown below:

<u>Title page, Item [54] and Column 1, line 1,</u>
Title, change "ELECTROMAGNETIC DIAPHRAGM PUMP" to
-- ELECTROMAGNETIC DIAPHRAGM PUMP WITH MULTIPLE PUMPING CHAMBERS --.

Signed and Sealed this

Nineteenth Day of August, 2003

JAMES E. ROGAN
*Director of the United States Patent and Trademark Office*